United States Patent Office 3,502,501
Patented Mar. 24, 1970

3,502,501
PROCESS FOR PREPARING AUXILIARY LAYERS FOR PHOTOGRAPHIC MATERIALS PREPARED FROM SYNTHETIC POLYMERS
Leonhard Burczyk and Renate Credo, Berlin-Friedrichshafen, Ernst Faulhaber, Berlin, and Willibald Muhlsteph, Schkopau, Germany, assignors to VEB Fotochemische Werke Berlin, Berlin-Kopenick, Germany
No Drawing. Filed Mar. 6, 1967, Ser. No. 620,660
Int. Cl. C03c 1/00; B44d 1/40
U.S. Cl. 117—34
2 Claims

ABSTRACT OF THE DISCLOSURE

A protective layer is provided on the emulsion side of a photographic film by applying on that side a synthetic latice prepared by mixing (a) an aqueous dispersion of a copolymer of an acrylic acid derivative with vinyl compounds, with (b) an aqueous solution of polyvinyl alcohol or a dispersion of low molecular weight vinyl ethinylcarbinol and (c) an additive such as an ester or ether of fatty acids, and homogenizing the composition.

BACKGROUND OF THE INVENTION

Polymer layers serving as protection against mechanical damage have been known for some time. However, for the most part the protective layers are waterproof varnish layers, applied on materials already developed (for example on movie film used for projection), or layers peeling off in alkaline developers. Only in recent years the issuing patents mentioned latices of synthetic polymers, particularly of copolymers of acrylic esters or their derivatives, and acrylic acid and its derivatives with additions of macromolecular products, especially gelatine. As far as these layers could be coated onto unexposed photographic materials at all, they had the disadvantage that in developing, they often did not peel off completely. A further disadvantage was, that the gelatine containing mixtures had to be applied on the photographic emulsion of the materials in molten state, thus at elevated temperature; this, in turn, leads to a warming up of the emulsion itself whereby defects in the products were frequently caused. Moreover, such film-forming substances are often not resistant to tropical climates, do not permit imprinting, and tend to become charged electrostatically.

Though the excellent properties of polyvinyl alcohol in preparing emulsions have been known for some time, its use in preparing photographic auxiliary layers has only been mentioned recently in patent literature. There it is described for use in mixture with polymers of acrylo- and/or methacrylonitrile. However, these emulsions tend to become turbid and cause a dulling effect on the film, which had to be suppressed by addition of plasticizers particularly developed for that purpose.

It is an object of the present invention to provide a method for the production of polymer emulsions containing polyvinyl alcohol in addition with other polymers than polyacrylonitrile, and without using components already used otherwise in the photographic system.

SUMMARY OF THE INVENTION

According to the invention, the object is accomplished by intimately mixing synthetic latices containing polyacrylates or copolymers of vinyl compounds and acrylates with an aqueous solution of polyvinyl alcohol or a dispersion of low molecular vinylethinyl carbinol and with one of the following additives: e.g. dicarboxylic polyglycerine ester, monoglycerine ester of saturated and/or unsaturated fatty acids, polyglycerine ester of saturated and/or unsaturated fatty acids, dioxy-diphenyl-alkane derivatives, polyoxypolydiphenyl-alkane derivatives, alkylphenol polyglycerine ether. The mixing is done, if necessary, at elevated temperature, with the use of a known mechanical homogenizer. The plastic layers are applied to the photographic material at room temperature using the customary coating technique.

The so prepared layers can be used principally as protective coatings against mechanical damage and, together with suitable additives, also as antistatic and bacteriostatic auxiliary layers. Furthermore, in multi-layer films, they can partly or completely prevent the diffusion between the recording emulsion layers. Great advantages are that they are easy to make and have a minimum influence on gradation and sensitivity.

In the following, a number of examples are given by way of illustration and not of limitation.

DESCRIPTION OF PREFERRED EMBODIMENTS

Example 1

To 500 ml. of a 20% aqueous dispersion of a copolymer of 40% acrylic ethylester and 60% acrylonitrile are added 500 ml. of a 2% solution of polyvinyl alcohol and 50 ml. of a 20% solution of diisobutenyl succinic acid sorbitol polyglycerine ester; the ingredients are rapidly mixed with a turbo-stirrer. The so prepared emulsion is applied to the emulsion side of a photographic film in a known manner. A highly transparent protective layer is obtained having good mechanical strength, which affects the properties, more particularly the gradation and sensitivity, to a negligible extent only.

Example 2

To 500 ml. of a 20% dispersion of a copolymer of 40% acrylic ethylester and 60% acrylonitrile are added 500 ml. of a 2% solution of polyvinyl alcohol and 63 ml. of a 20% solution of α-monocapryline, and the ingredients are mixed rapidly with a turbo-stirrer. The so prepared emulsion is applied to the emulsion side of a photographic film in a known manner, and the same photographic properties are obtained as described in Example 1.

Example 3

To 500 ml. of a 20% dispersion of a copolymer of 40% acrylic ethylester and 60% acrylonitrile are added 500 ml. of a 2% solution of polyvinyl alcohol and 80 ml. of a 20% solution of caprylic polyglycerine ester; the ingredients are vigorously mixed with a turbo-stirrer. The so prepared emulsion is applied to the emulsion side of a photographic film in a known manner, and the same photographic properties are obtained as described in Example 1.

Example 4

To 500 ml. of a 20% dispersion of a copolymer of 40% acrylic ethylester and 60% acrylonitrile are added 500 ml. of a 2% solution of polyvinyl alcohol and 45 ml. of a 20% solution of n-amylphenoltetraglycerine ether; the ingredients are vigorously mixed with a turbo-stirrer. The so prepared emulsion is applied to the emulsion side of a photographic film in a known manner, and the same photographic properties are obtained as described in Example 1.

Example 5

To 500 ml. of a 20% dispersion of a copolymer of 40% acrylic ethylester and 60% acrylonitrile are added 500 ml. of a 2% solution of polyvinyl alcohol and 57 ml. of a 20% solution of nonane-2,2′ bis-(p-phenol)-polyglycerine ether; the ingredients are vigorously mixed with a turbo-stirrer. The so prepared emulsion is applied to the emulsion side of a photographic film in a known manner, and the same photographic properties are obtained as described in Example 1.

Example 6

To 500 ml. of a 20% dispersion of a copolymer of 40% acrylic ethylester and 60% acrylonitrile are added 500 ml. of a 2% solution of polyvinyl alcohol and 42 ml. of a 20% solution of heptane-7,7′ bis-[2 oxy-4(α-heptylphenol)-benzene]-polyglycerine ether; the ingredients are vigorously mixed with a turbo-stirrer. The so prepared emulsion is applied to the emulsion side of a photographic film in a known manner, and the same photographic properties are obtained as described in Example 1.

Example 7

To an emulsion prepared according to any one of Examples 1–6, a fungicide is additionally added, such as for example pentachlorophenol, in quantities up to 0.01%. The coatings so prepared on a photographic material exhibit a strong bactericidal and fungicidal activity. In a similar manner, it is possible to add an anti-static substance, for example trimethyl octadecyl ammonium methosulfate, or an electrolyte having high surface activity together with oxyethyl cellulose or oxyethylated cellulose ether to the emulsion, such addition being without disadvantage in use.

Example 8

To 500 ml. of a dispersion of a copolymer of 60% acrylic ethylester and 40% vinyl acetate (content of solids 10%) are added while continually stirring 2000 ml. of a 1% solution of polyvinyl alcohol and adding 100 ml. of a 20% solution of n-butylphenyl tetraglycerine ether intensively mixed. The so prepared emulsion is applied to the emulsion side of a photographic film in a known manner. A highly transparent protective coating having a great mechanical strength is obtained.

Example 9

1000 ml. of a 4% solution of polyvinyl alcohol heated to 60° C. are homogenized with 400 ml. of a 10% dispersion of polymethacrylic methyl ester and 70 ml. of a 20% solution of p-tert.-octylphenol-polyglycerine ether. The temperature of the prepared emulsion is adjusted to 20° C. and the recently prepared emulsion is applied to the emulsion side of an X-ray film in a known manner. A protective coating with great mechanical strength is obtained influencing the photographic characteristics, particularly gradation and sensitivity, to a negligible extent only.

Example 10

1000 ml. of a 1% dispersion of low molecular vinylethinyl arbinol are thoroughly mixed with 400 ml. of a 10% dispersion of polymethacrylic methyl ester and 110 ml. tridecenyl succinic polyglycerine ester. The prepared dispersion is applied to the emulsion side of a photographic X-ray film in a known manner. According to the above-mentioned example a protective coating having a great mechanical strength is obtained.

What is claimed is:

1. A method of preparing protective layers for photographic materials, which comprises mixing together (a) an aqueous dispersion of a polymer or copolymer of an acrylic acid derivative with vinyl compounds, with (b) an aqueous solution of polyvinyl alcohol or a dispersion of low molecular weight vinyl ethinylcarbinol and (c) an additive selected from the group consisting of dicarboxylic acid polyglycerine ester, monoglycerine ester of saturated fatty acids and unsaturated fatty acids, polyglycerine ester of saturated fatty acids and unsaturated fatty acids, dioxy-diphenyl-alkane derivatives, polyoxypolydiphenyl-alkane derivatives, alkylphenol polyglycerine ether, homogenizing and applying said homogenized composition to the emulsion side of a photographic film at room temperature.

2. A method of preparing protective layers for photographic materials according to claim 1, wherein component (b) is low molecular vinylethinyl carbinol.

References Cited

UNITED STATES PATENTS

| 2,311,058 | 2/1943 | Lowe | 117—34 |
| 2,311,059 | 2/1943 | Lowe | 96—114 |
| 3,000,741 | 9/1961 | De Pauw | 96—114 |
| 3,079,837 | 3/1963 | Theilemann | 117—34 |

FOREIGN PATENTS

| 680,225 | 4/1966 | Belgium. |
| 634,174 | 4/1963 | Belgium. |
| 1,153,249 | 8/1963 | Germany. |
| 4,272 | 1964 | Japan. |

WILLIAM D. MARTIN, Primary Examiner

W. R. TRENOR, Assistant Examiner

U.S. Cl. X.R.

96—50, 94, 114; 117—76, 83